(12) United States Patent
Lee et al.

(10) Patent No.: US 8,638,859 B2
(45) Date of Patent: Jan. 28, 2014

(54) APPARATUS FOR DECODING RESIDUAL DATA BASED ON BIT PLANE AND METHOD THEREOF

(75) Inventors: Jae-Jin Lee, Daejeon (KR); Kyung Su Kim, Seoul (KR); Jun Young Lee, Busan (KR); Sang Heon Lee, Daejeon (KR); Nak Woong Eum, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 320 days.

(21) Appl. No.: 13/226,765

(22) Filed: Sep. 7, 2011

(65) Prior Publication Data

US 2012/0128075 A1    May 24, 2012

(30) Foreign Application Priority Data

Nov. 23, 2010    (KR) .................. 10-2010-0117120

(51) Int. Cl.
*H04N 7/12*    (2006.01)
*H04N 11/02*    (2006.01)

(52) U.S. Cl.
USPC ............................... 375/240.23; 375/240.25

(58) Field of Classification Search
USPC ...................................... 375/240.01–240.29
See application file for complete search history.

(56) References Cited

U.S. PATENT DOCUMENTS

| 6,480,547 B1* | 11/2002 | Chen et al. ............... 375/240.27 |
| 6,788,740 B1* | 9/2004 | van der Schaar et al. ..... 375/240 |
| 2008/0043846 A1* | 2/2008 | Yokoyama ............... 375/240.16 |
| 2011/0116550 A1* | 5/2011 | Lee et al. ................. 375/240.25 |

OTHER PUBLICATIONS

Nomura, S. et al., "A 9.7mW AAC-Decoding, 620mW H.264 720p60fps Decoding, 8-Core Media Processor with Embedded Forward-Body-Biasing and Power-Gating Circuit in 65nm CMOS Technology", Solid-State Circuit Conference, Feb. 3-7, 2008, ISSCC 2008, Session 13, Mobile Processing. 13.4, pp. 262-263, and 612.

* cited by examiner

*Primary Examiner* — David Czekaj
*Assistant Examiner* — Janese Duley
(74) *Attorney, Agent, or Firm* — Rabin & Berdo, P.C.

(57) ABSTRACT

An apparatus for decoding residual data based on a bit plane and a method thereof, capable of achieving a significant reduction in data traffic between a memory and a functional module in a parallel decoding system, include a variable length decoding module configured to generate residual data for each macroblock from a bit stream, divide the residual data into groups, and generate a bit plane regarding each of the groups, and a variable length decoding memory configured to store the bit plane generated from the variable length decoding module and store the residual data of the groups according to a value of the bit plane.

10 Claims, 5 Drawing Sheets

Fig. 2
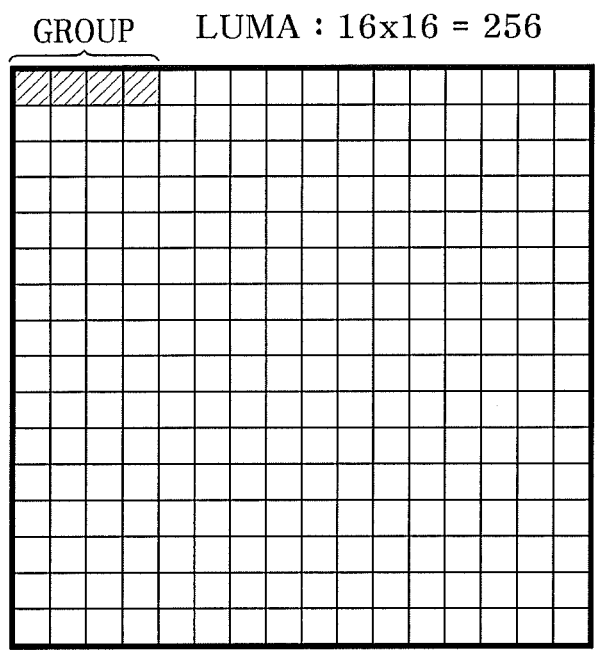
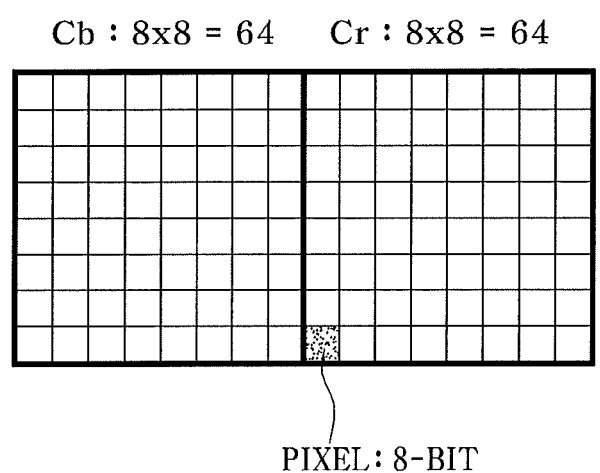

APPARATUS FOR DECODING RESIDUAL DATA BASED ON BIT PLANE AND METHOD THEREOF

CROSS-REFERENCE TO RELATED APPLICATIONS

The present application claims priority to Korean patent application No. 10-2010-0117120, filed on Nov. 23, 2010, which is incorporated by reference in its entirety.

BACKGROUND OF THE INVENTION

The present invention relates to an apparatus for decoding residual (i.e., prediction error) data based on a bit plane and a method thereof, and more particularly, to an apparatus for decoding residual data based on a bit plane, configured to achieve a significant reduction in data traffic between a memory and a functional module in a parallel decoding system, and a method thereof.

Video compression/decompression schemes, indispensable to multimedia applications, are being implemented by new video standards, enabling the achievement of a very high compression rate and reliable transmission, such as H.264/AVC, VC-1, and AVS, as well as MPEG in current use for HD TV broadcasting.

In particular, new compression standards are in convergence with next generation services, such as digital data broadcasting, next generation mobile phones, Internet protocol television (IPTV), satellite digital multimedia broadcasting (DMB) or the like, thereby forming expectations on the application thereof.

Video compression technologies have been developed aiming at reducing a bandwidth by reducing a bit size while making decompressed image quality as identical to original image quality as possible.

Thus, when compared to existing image compression standards such as MPEG-2, the new video compression standards have considerably increased algorithm complexity and high computational complexity and thus demand dedicated hardware devices for real-time compression/decompression.

Variable length decoding, performed in a recent decoding process according to video compression standards, makes it difficult to implement the parallel processing of a decoding system due to sequence characteristics of the process of sequentially parsing input bit streams. However, there has been no solution for this difficulty so far.

A typical video parallel decoding method adopts a method of parsing data of a single or predetermined frame in advance by using a high-speed variable length decoding module, storing the parsed data and performing parallel processing upon the corresponding data.

The technical configuration described above is merely a background art for assisting with the understanding of the present invention and does not represent conventional techniques well known in the art to which the present invention pertains.

SUMMARY OF THE INVENTION

Embodiments of the present invention are directed to an apparatus for decoding residual data based on a bit plane and a method thereof, capable of achieving a significant reduction in data traffic between a memory and a functional module in a parallel decoding system by storing residual data using a bit plane indicating whether residual data is zero or non-zero in order to effectively process the residual data from a bit stream.

In one embodiment, an apparatus for decoding residual data based on a bit plane includes: a variable length decoding module configured to generate residual data for each macroblock from a bit stream, divide the residual data into groups, and generate a bit plane regarding the groups; and a variable length decoding memory configured to store the bit plane generated from the variable length decoding module and store the residual data of the groups according to a value of the bit plane.

The variable length decoding module may divide the residual data for each macroblock by grouping a plurality of consecutive pixels as a single group.

The variable length decoding module may set the bit plane to "0" when all the residual data within a group of the divided groups are "0", and set the bit plane to "1" when at least one of the residual data within a group of the divided groups is not "0".

The variable length decoding memory may store the residual data only for a group the bit plane of which has a value of "1" among the groups.

The apparatus may further include a multi-processor reading the bit plane from the variable length decoding memory, and reading the residual data depending on a value of the bit plane or setting the residual data to "0" to thereby decode the bit stream.

In another embodiment, a method of decoding residual data based on a bit plane includes: generating residual data for each macroblock from a bit stream; dividing the residual data for each macroblock into groups; generating a bit plane regarding the groups; and storing the bit plane and storing the residual data regarding the groups depending on a value of the bit plane.

In the dividing of the residual data into groups, a plurality of consecutive pixels within the macroblock may be grouped as one group.

In the generating of the bit plane, the bit plane regarding each of the groups may be generated by setting the bit plane regarding a corresponding group of the groups to "0" when all the residual data within the corresponding group are "0", and setting the bit plane regarding a corresponding group of the groups to "1" when at least one of the residual data within the corresponding group is not "0".

In the storing of the residual data regarding the groups, the residual data may be stored only for a group the bit plane of which has a value set to "1" among the groups.

The method may further include: reading the bit plane; and performing a variable length decoding function by reading the residual data or setting the residual data to "0" depending on a value of the bit plane.

BRIEF DESCRIPTION OF THE DRAWINGS

FIG. 2 illustrates the size of residual data according to one embodiment of the present invention.

DESCRIPTION OF SPECIFIC EMBODIMENTS

Hereinafter, an apparatus for decoding residual data based on a bit plane and a method thereof in accordance with the present invention will be described in detail with reference to the accompanying drawings.

Hereinafter, the present invention will be more fully described according to embodiments, but it should be noted that the embodiments are intended to exemplify the present invention, not to limit the scope of the present invention.

In the figures, the thicknesses of lines, the sizes of elements or the like may be exaggerated for clarity and ease of illustration. Furthermore, terms used herein are defined in due considerations functions in the present invention and may vary according to a user/an operator's indention or practice. Therefore, the terms should be defined on the basis of the disclosure throughout the specification.

Figure 1:
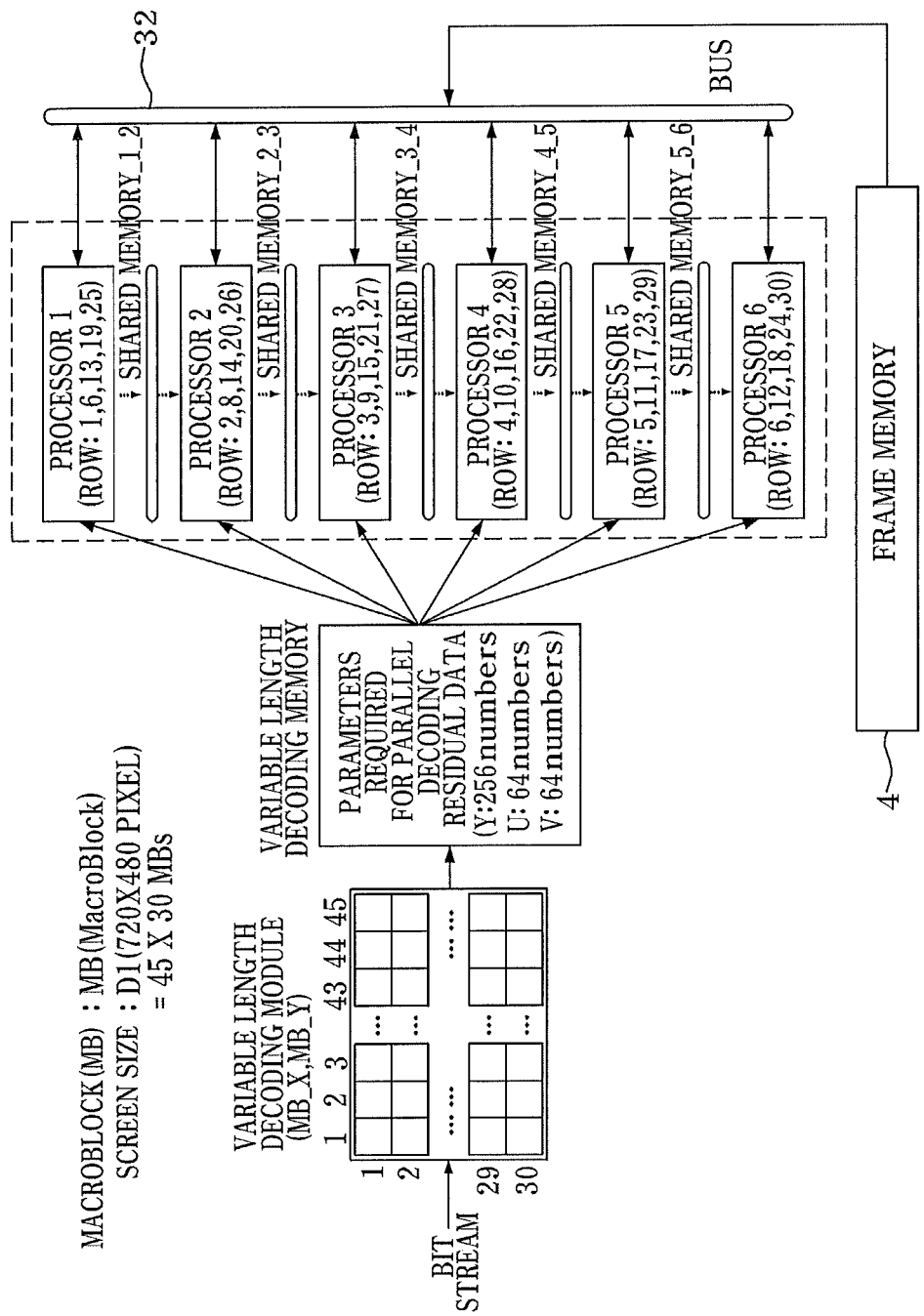
FIG. 1 illustrates the configuration of an apparatus for decoding residual data based on a bit plane according to one embodiment of the present invention.
Figure 3:
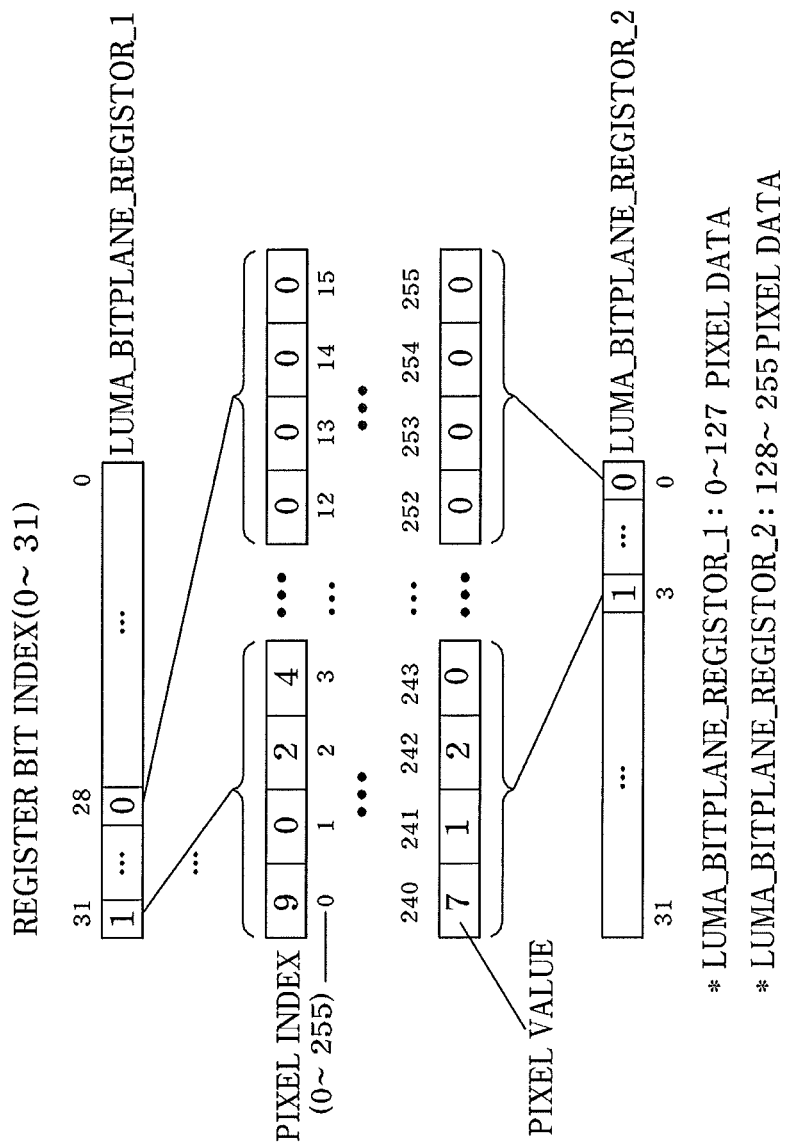
FIG. 3 illustrates a method of decoding residual data based on a bit plane with respect to LUMA data according to one embodiment of the present invention.
Figure 4:
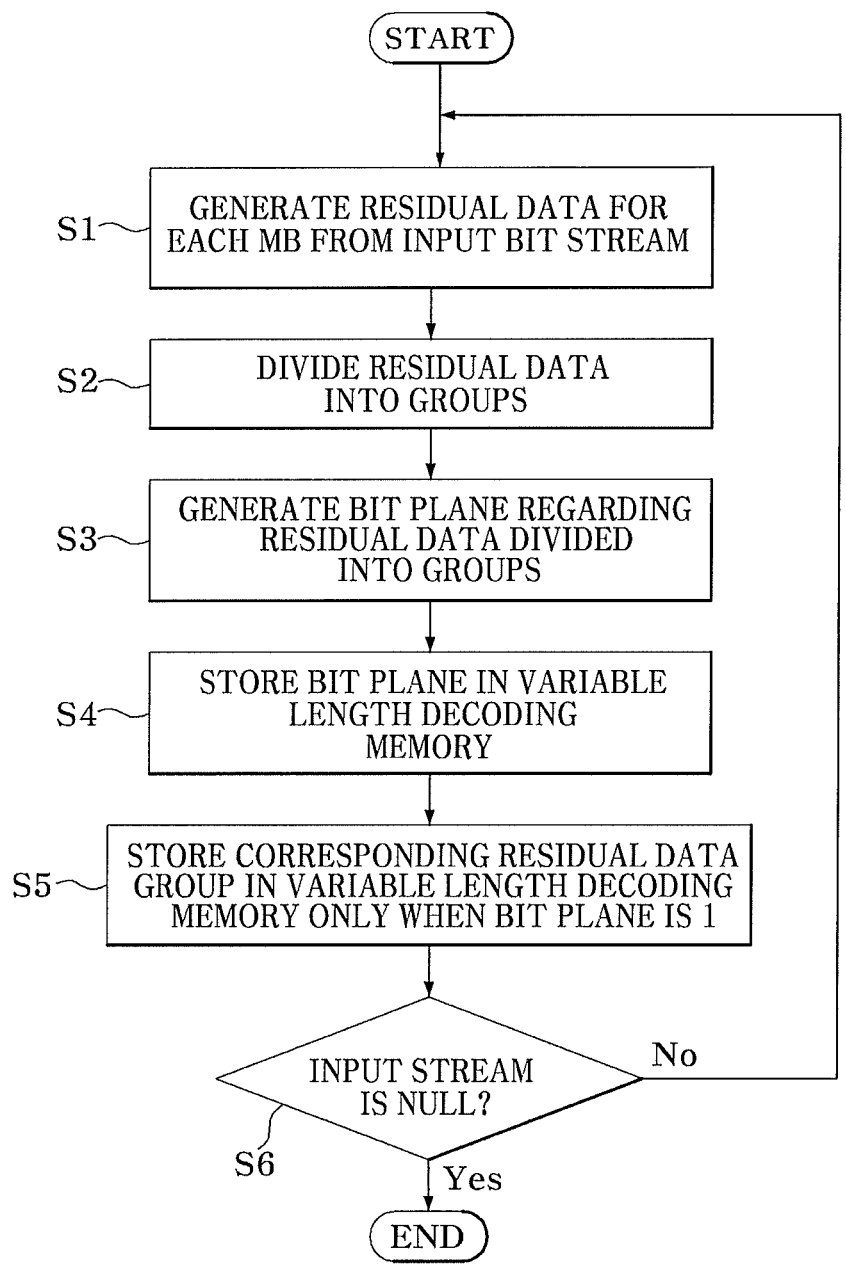
FIG. 4 illustrates a method of decoding residual data based on a bit plane in a variable length decoding module according to one embodiment of the present invention.
Figure 5:
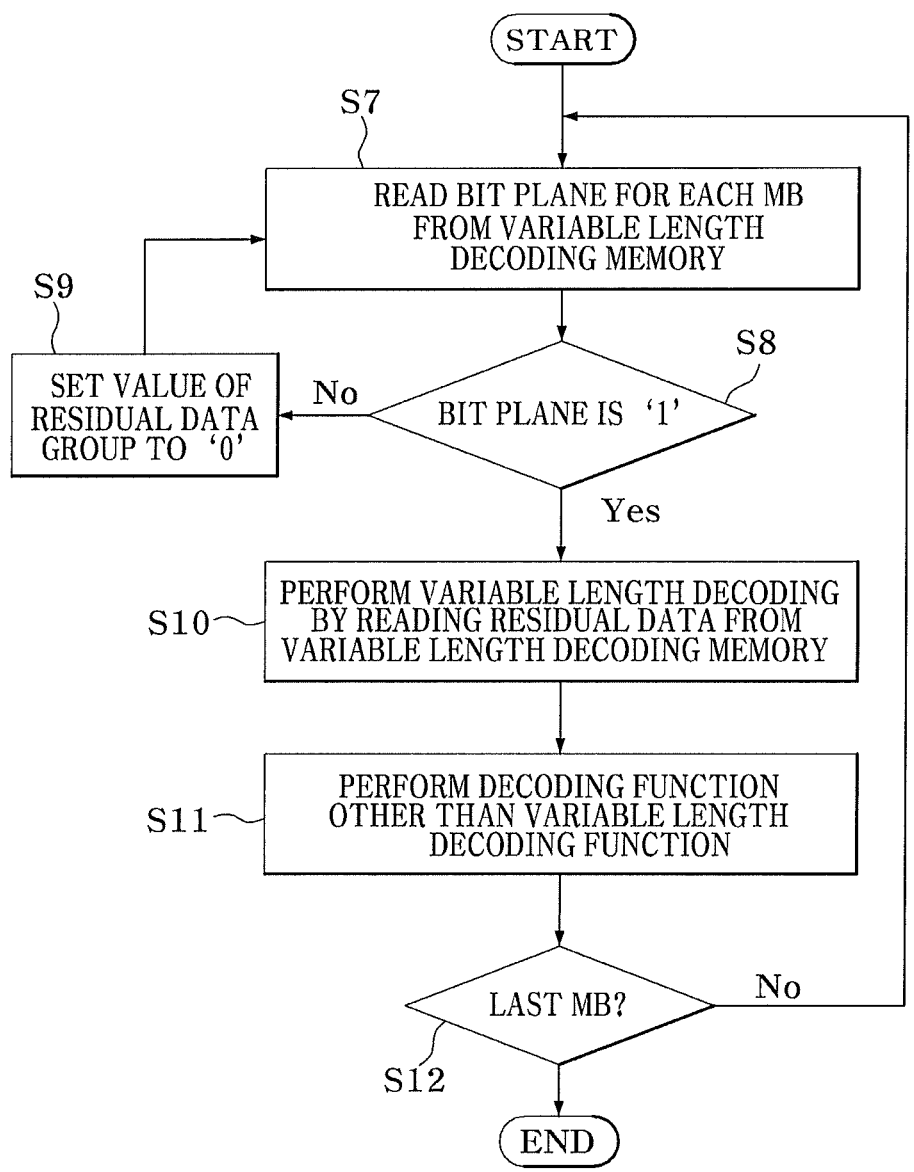
FIG. 5 illustrates the execution of a decoding function of a multi-processor according to one embodiment of the present invention.

FIG. 1 illustrates the configuration of an apparatus for decoding residual data based on a bit plane according to one embodiment of the present invention, FIG. 2 illustrates the size of residual data according to one embodiment of the present invention, FIG. 3 illustrates a method of decoding residual data based on bit plane with respect to LUMA data according to one embodiment of the present invention, FIG. 4 illustrates a method of decoding residual data based on bit plane in a variable length decoding module according to one embodiment of the present invention, and FIG. 5 illustrates the execution of a decoding function of a multi-processor according to one embodiment of the present invention.

Referring to FIG. 1 through FIG. 3, an apparatus for decoding residual data based on a bit plane, according to one embodiment of the present invention, includes a variable length decoding module 1, a variable length decoding memory 2, a multi-processor 3 and a frame memory 4.

The variable length decoding module 1 generates residual data for each macroblock from a bit stream, and divides the residual data into groups, and generates a bit plane regarding the groups.

The residual data has more zero values as an image has higher quantization parameters (QP) and less motion.

For the effective processing of the residual data having the above characteristics, a bit plane indicating whether the residual data is zero or non-zero is used.

A bit plane contains 1-bit information indicating a group (e.g., four consecutive pixels) of corresponding residual data is zero or non-zero.

The variable length decoding module 1 stores, in the variable length decoding memory 2, not only basic parameters required for decoding but also residual data based on a bit plane from an input bit stream after performing parsing upon the residual data regarding 384 8-bit pixels for each macroblock in the case of YUV (Y, Cb and Cr) 4:2:0 format as shown in FIG. 2.

Here, the variable length decoding module 1 divides the residual data for each macroblock by grouping a plurality of consecutive pixels into one group.

As shown in FIG. 3, the variable length decoding module 1 sets a bit plane regarding a group to be "0" when all the residual data within the group are "0", and sets the bit plane to "1" when at least one of the residual data within the group is not "0".

For example, as shown in FIG. 3, when all the residual data regarding pixel index 12 to pixel index 15 are "0", register bit plane index 28 is set to "0", while when at least one of the residual data of pixel index 0 to pixel index 3 is not "0", register bit plane index 31 is set to "1".

The variable length decoding memory 2 stores the bit plane generated from the variable length decoding module 1, and stores the residual data within a group according to a value of the bit plane.

That is, the variable length decoding memory 2 stores the residual data regarding only a group having a bit-plane value of "1".

The multi-processor 3 reads a bit plane from the variable length decoding memory 2, and reads the residual data or sets the residual data to "0" according to a value of the bit-plane, thereby decoding the bit stream.

The multi-processor 3 reads the bit plane from the variable length decoding memory 2, and sets the residual data to "0" when a value of the bit plane is "0" or read the residual data when the value of the bit plane is "1", thereby performing a variable length decoding function.

Herein, shared memories 31 are used for inter-processor communication, and a frame memory 4 is used to store a decoded image.

As described above, the present invention is based on the bit plane indicating whether residual data is zero or non-zero, in order to reduce data traffic between the variable length decoding memory 2 and the multi-processor 3.

A method of decoding residual data based on a bit plane according to one exemplary embodiment of the present invention will now be described.

Referring to FIG. 4, first, the variable length decoding module 1 generates residual data for each macroblock (MB) from a bit stream in operation S1.

Thereafter, the residual data for each macroblock is divided into groups (hereinafter, also referred to as residual data groups) in operation S2.

Then, a bit plane regarding each of the groups is generated in operation S3.

The generated bit plane is stored in the variable length decoding memory 2 in operation S4, and the residual data of the group is stored depending on a value of the bit plane in operation S5.

For example, all the values of a residual data group are zero, the variable length decoding module 1 simply sets a corresponding bit plane to "0" without storing the corresponding data in the variable length decoding memory 2.

In contrast, at least one value of the residual data group is not zero, the variable length decoding module 1 stores the corresponding data in the variable length decoding memory 2 and sets a corresponding bit plane to "1".

The above process is repetitively performed unless a stream bit is NULL in operation S6.

Hereinafter, a decoding process will be described.

Referring to FIG. 5, the multi-processor 3 reads the bit plane from the variable length decoding memory 2 in operation S7.

Subsequently, it is determined as to whether or not a value of the bit plane is "1" in operation S8.

When the bit plane is "0" in operation S8, all the residual data of a corresponding group are set to "zero" without reading the same from the variable length decoding memory 2 and the rest of the decoding process is performed in operation S9.

In contrast, when the bit plane is "1", the values of the residual data corresponding to the bit plane are read from the variable length decoding memory 2 and then the rest of the decoding process is performed in operations S10 and S11.

According to this embodiment, data transmission between the variable length decoding memory 2 and the multi-processor 3 is performed in units of 32-bit words.

Therefore, as shown in FIG. 3, a bit plane is formed upon processing four pixel data inputs, each of 8 bits, as a single group.

Furthermore, as shown in FIG. 3, a bit plane of 64-bit size (256/4) is required for LUMA residual data constituted of 256 pixels, and thus two 32-bit registers of LUMA_bitplane_register1 and LUMA_bitplane_register2 are used.

In the cases of Cb and Cr, bit planes, each of 16-bits, are required for both cases and may be stored by packing them into a single 32-bit register.

As a result, a bit plane constituted upon four-pixel grouping per macroblock may be implemented by three 32-bit registers, and the variable length decoding module makes memory access three times for each macroblock in order to transfer the bit plane to the variable length decoding memory.

Also, a module performing a decoding function other than a variable length decoding function interprets bit-plane information regarding a macroblock through three memory accesses and reads corresponding residual data only when the bit plane is "1".

In such a manner, the method of decoding residual data based on a bit plane may achieve a significant reduction in data traffic between the variable length decoding memory 2 and the multi-processor 3.

As set forth above, according to the embodiments of the present invention, data traffic between a memory and a functional module in a parallel decoding system can be significantly reduced by storing residual data using a bit plane.

While the present invention has been described with respect to the specific embodiments, it will be apparent to those skilled in the art that various changes and modifications may be made without departing from the spirit and scope of the invention as defined in the following claims.

What is claimed is:

1. An apparatus for decoding residual data based on a bit plane, the apparatus comprising:
a variable length decoding module configured to generate residual data for each macroblock from a bit stream, divide the residual data into groups, and generate a bit plane regarding the groups; and
a variable length decoding memory configured to store the bit plane generated from the variable length decoding module and store the residual data of the groups according to a value of the bit plane.

2. The apparatus of claim 1, wherein the variable length decoding module divides the residual data for each macroblock by grouping a plurality of consecutive pixels as a single group.

3. The apparatus of claim 1, wherein the variable length decoding module sets the bit plane to "0" when all the residual data within a group of the divided groups are "0", and sets the bit plane to "1" when at least one of the residual data within a group of the divided groups is not "0".

4. The apparatus of claim 3, wherein the variable length decoding memory stores the residual data only for a group the bit plane of which has a value of "1" among the groups.

5. The apparatus of claim 1, further comprising a multi-processor reading the bit plane from the variable length decoding memory, and reading the residual data depending on a value of the bit plane or setting the residual data to "0" to thereby decode the bit stream.

6. A method of decoding residual data based on a bit plane, the method comprising:
generating residual data for each macroblock from a bit stream;
dividing the residual data for each macroblock into groups;
generating a bit plane regarding the groups; and
storing the bit plane and storing the residual data regarding the groups depending on a value of the bit plane.

7. The method of claim 6, wherein, in the dividing of the residual data into groups, a plurality of consecutive pixels within the macroblock are grouped as one group.

8. The method of claim 6, wherein, in the generating of the bit plane, the bit plane regarding each of the groups is generated by setting the bit plane regarding a corresponding group of the groups to "0" when all the residual data within the corresponding group are "0", and setting the bit plane regarding a corresponding group of the groups to "1" when at least one of the residual data within the corresponding group is not "0".

9. The method of claim 6, wherein, in the storing of the residual data regarding the groups, the residual data are stored only for a group the bit plane of which has a value set to "1" among the groups.

10. The method of claim 6, further comprising:
reading the bit plane; and
performing a variable length decoding function by reading the residual data or setting the residual data to "0" depending on a value of the bit plane.

* * * * *